B. F. MULL.
Earth-Auger.

No. 203,637.  Patented May 14, 1878.

WITNESSES:
Henry N. Miller
C. Sedgwick

INVENTOR:
B. F. Mull
BY Munn & Co.
ATTORNEYS.

UNITED STATES PATENT OFFICE.

BENJAMIN F. MULL, OF MERCED, CALIFORNIA.

IMPROVEMENT IN EARTH-AUGERS.

Specification forming part of Letters Patent No. 203,637, dated May 14, 1878; application filed March 26, 1878.

*To all whom it may concern:*

Figure 1:
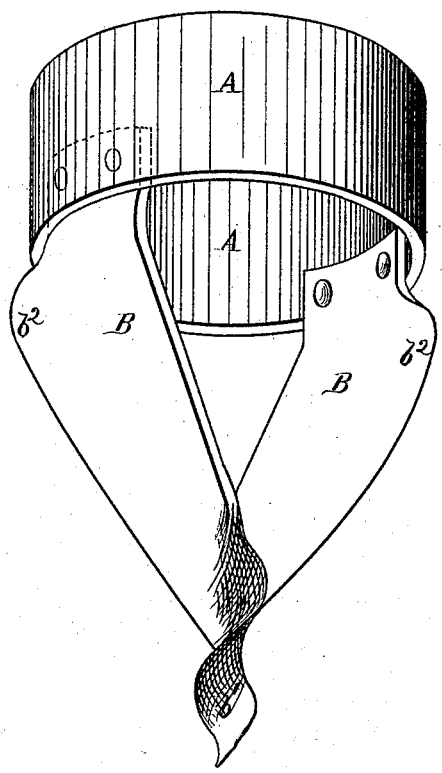
Figure 2:
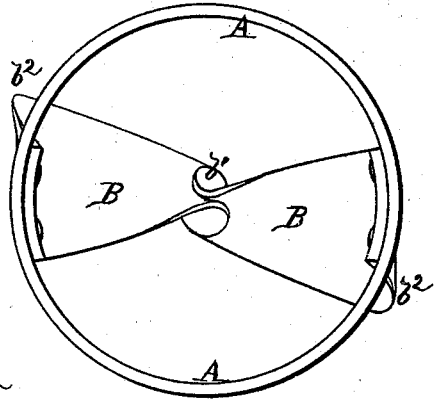

Be it known that I, BENJAMIN F. MULL, of Merced, in the county of Merced and State of California, have invented a new and useful Improvement in Earth-Augers, of which the following is a specification:

Figure 1 is a perspective view of my improved earth-auger. Fig. 2 is a bottom view of the same.

Similar letters of reference indicate corresponding parts.

The object of this invention is to furnish an improved auger for use in boring wells, post-holes, &c., which shall be simple in construction and convenient and effective in use, being so constructed as to work in either hard or soft ground, as may be required.

The invention consists in the bit made V-shaped, having a screw-point formed upon its angle, and having the forward edges of its arms or wings made sharp and extended beyond the circumference of the tube, to which the shanks of the said bit are attached, as hereinafter fully described.

A represents a tube, which may be the end of a tubular shaft, or a short tube, to be attached to the said tubular shaft. To the opposite sides of the lower end of the tube A are secured the shanks of the bit B, which is made in V shape, and has a screw-point, $b^1$, formed upon its angle to lead the bit into the ground. The forward edges $b^2$ of the wings or arms of the bit B are flared outward, are made sharp, and are extended beyond the circumference of the tube A, so as to cut a hole larger than the said tube A, to enable the said tube to be readily raised and lowered through the said hole.

The peculiar form of the bit B not only causes the auger to feed itself rapidly into the ground, but it adapts the said bit to serve as a support for the earth in the tube A, and to keep the dirt in the said tube while being raised out of the hole.

Having thus described my invention, I claim as new and desire to secure by Letters Patent—

The bit B made V-shaped, having a screw-point, $b^1$, formed upon its angle, and having the forward edges $b^2$ of its arms or wings made sharp, flared, and extended beyond the circumference of the tube A, to which the shanks of the said bit B are attached, substantially as herein shown and described.

BENJAMIN F. MULL.

Witnesses:
JOHN K. LAW,
T. CHAL. LAW.